(12) United States Patent
Chen

(10) Patent No.: US 12,052,096 B2
(45) Date of Patent: Jul. 30, 2024

(54) DOWNLINK CONTROL INFORMATION DETECTION METHOD AND APPARATUS

(71) Applicant: SANECHIPS TECHNOLOGY CO., LTD, Shenzhen (CN)

(72) Inventor: Yu Chen, Shenzhen (CN)

(73) Assignee: SANECHIPS TECHNOLOGY CO., LTD, Shenzhen (CN)

( * ) Notice: Subject to any disclaimer, the term of this patent is extended or adjusted under 35 U.S.C. 154(b) by 205 days.

(21) Appl. No.: 17/784,377

(22) PCT Filed: Dec. 14, 2020

(86) PCT No.: PCT/CN2020/136192
§ 371 (c)(1),
(2) Date: Jun. 10, 2022

(87) PCT Pub. No.: WO2021/115486
PCT Pub. Date: Jun. 17, 2021

(65) Prior Publication Data
US 2023/0050327 A1 Feb. 16, 2023

(30) Foreign Application Priority Data
Dec. 13, 2019 (CN) .......................... 201911282808.2

(51) Int. Cl.
H04L 1/00 (2006.01)
H04L 1/16 (2023.01)
(Continued)

(52) U.S. Cl.
CPC .............. *H04L 1/0036* (2013.01); *H04L 1/16* (2013.01); *H04L 1/203* (2013.01); *H04W 28/04* (2013.01)

(58) Field of Classification Search
CPC ......... H04L 1/0036; H04L 1/16; H04L 1/203; H04L 1/08; H04L 1/0039; H04L 1/0072;
(Continued)

(56) References Cited

U.S. PATENT DOCUMENTS

2019/0254013 A1* 8/2019 Chang ...................... H04L 5/00
2019/0305899 A1* 10/2019 Rico Alvarino ...... H04W 24/10
(Continued)

FOREIGN PATENT DOCUMENTS

CN 104753634 A 7/2015
CN 105577336 A 5/2016
(Continued)

OTHER PUBLICATIONS

International Search Report for corresponding application PCT/CN2020/136192 filed Dec. 14, 2020; Mail date Mar. 12, 2021.
(Continued)

*Primary Examiner* — Afshawn M Towfighi
(74) *Attorney, Agent, or Firm* — CANTOR COLBURN LLP

(57) ABSTRACT

A detection method and apparatus, a terminal, and a storage medium are provided. The method includes that: a decoding parameter in a process that a decoder of a Narrowband Physical Downlink Control Channel (NPDCCH) decodes Downlink Control Information (DCI), a comparison parameter obtained by comparing an encoding result obtained by reversely encoding the decoded DCI by an encoder of the NPDCCH with the DCI before decoding, and a Signal-to-Noise Ratio (SNR) of the DCI are acquired; in a case where the decoding parameter, the comparison parameter and the SNR satisfy a first valid condition, a data transmission repetition number and a search space length of the NPDCCH are acquired; and in a case where the search space length matches the number of subframes corresponding to the data
(Continued)

transmission repetition number, it is determined that the DCI is valid.

20 Claims, 4 Drawing Sheets

(51) Int. Cl.
 *H04L 1/20* (2006.01)
 *H04W 28/04* (2009.01)
(58) Field of Classification Search
 CPC ... H04L 5/0053; H04L 5/0062; H04L 1/0045; H04W 28/04; H04W 4/70; H04W 72/23
 See application file for complete search history.

(56) References Cited

U.S. PATENT DOCUMENTS

| | | | |
|---|---|---|---|
| 2020/0187173 A1* | 6/2020 | Ye | H04L 41/0806 |
| 2020/0245118 A1* | 7/2020 | Kurth | H04W 4/80 |
| 2021/0274536 A1* | 9/2021 | Shin | H04W 72/535 |
| 2021/0314925 A1* | 10/2021 | Shin | H04L 5/0053 |
| 2021/0385848 A1* | 12/2021 | Hwang | H04W 72/23 |

FOREIGN PATENT DOCUMENTS

| | | |
|---|---|---|
| CN | 105763286 A | 7/2016 |
| CN | 109787710 A | 5/2019 |
| CN | 110326343 A | 10/2019 |
| WO | 2012003675 A1 | 1/2012 |
| WO | 2016015213 A1 | 2/2016 |
| WO | 2018084954 A1 | 5/2018 |
| WO | 2019075641 A1 | 4/2019 |
| WO | 2019144345 A1 | 8/2019 |

OTHER PUBLICATIONS

Carlo Condo, "Blind Detection with Polar Codes", arxiv.org, May 4, 2017, XP080946151.

European Search Report for corresponding application EP 2089 8223; Report dated Jan. 11, 2023.

Futurewei, "Feature lead summary of Support for transmission in preconfigured UL resources" 3GPP TSG RAN WGI Meeting #98, Pragtue Czech Reublic, Aug. 26-30, 2019.

* cited by examiner

Fig. 1

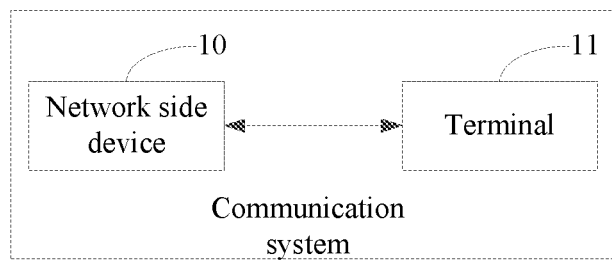

Communication system

Fig. 2

Acquire a decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI — S101

In a case where the decoding parameter, the comparison parameter and the SNR satisfy a first valid condition, acquire a data transmission repetition number and a search space length of the NPDCCH — S102

In a case where the search space length matches the number of subframes corresponding to the data transmission repetition number, determine that the DCI is valid — S103

DOWNLINK CONTROL INFORMATION DETECTION METHOD AND APPARATUS

CROSS REFERENCE

This application is a National Stage Filing of the PCT International Application No. PCT/CN2020/136192 filed on Dec. 14, 2020, which claims priority to Chinese Application No. 201911282808.2 filed on Dec. 13, 2019, the entirety of which is herein incorporated by reference.

TECHNICAL FIELD

The present disclosure relates to the field of communications, and in particular to a detection method and apparatus, a terminal, and a storage medium.

BACKGROUND

At present, Narrow Band Internet of Things (NB-IoT) is already widely used in many industries, such as remote meter reading, asset tracking, intelligent parking and intelligent agriculture. In an NB-IoT communication system, sets of key parameters required by a terminal side to receive downlink data or send uplink data are indicated by Downlink Control Information (DCI) carried in a Narrowband Physical Downlink Control Channel (NPDCCH) sent by a network side, so it is crucial to detect the DCI correctly. However, due to complicated and changeable wireless environments in the NB-IoT, error detection occurs from time to time when the terminal side detects the DCI. In this case, if the terminal side conducts data scheduling based on the wrong DCI, a large number of unnecessary data retransmissions occur, which leads to the abnormality of a data transmission link.

SUMMARY

Embodiments of the present disclosure provide a detection method and apparatus, a terminal, and a storage medium.

The embodiments of the present disclosure provide a detection method, which includes the following operations.

A decoding parameter in a process that a decoder of an NPDCCH decodes DCI, a comparison parameter obtained by comparing an encoding result obtained by reversely encoding the decoded DCI by an encoder of the NPDCCH with the DCI before decoding, and a Signal-to-Noise Ratio (SNR) of the DCI are acquired.

In a case where the decoding parameter, the comparison parameter and the SNR satisfy a first valid condition, a data transmission repetition number and a search space length of the NPDCCH are acquired.

In a case where the search space length matches the number of subframes corresponding to the data transmission repetition number, it is determined that the DCI is valid.

The embodiments of the present disclosure provide a detection apparatus, which includes a first acquiring module, a second acquiring module and a first determining module.

The first acquiring module is configured to acquire a decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI.

The second acquiring module is configured to acquire, in a case where the decoding parameter, the comparison parameter and the SNR satisfy a first valid condition, a data transmission repetition number and a search space length of the NPDCCH.

The first determining module is configured to determine, in a case where the search space length matches the number of subframes corresponding to the data transmission repetition number, that the DCI is valid.

The embodiments of the present disclosure provide a terminal, which includes a memory and a processor. The memory stores a computer program. When executing the computer program, the processor implements any method in the embodiments of the present disclosure.

The embodiments of the present disclosure provide a storage medium, which stores a computer program. When executed by the processor, the computer program implements any method in the embodiments of the present disclosure.

BRIEF DESCRIPTION OF THE DRAWINGS

FIG. 1 is an architecture diagram of a system in which a detection method provided by the embodiments of the present disclosure is applied.

FIG. 2 is a flowchart of a detection method provided by the embodiments of the present disclosure.

DETAILED DESCRIPTION

Figure 3:
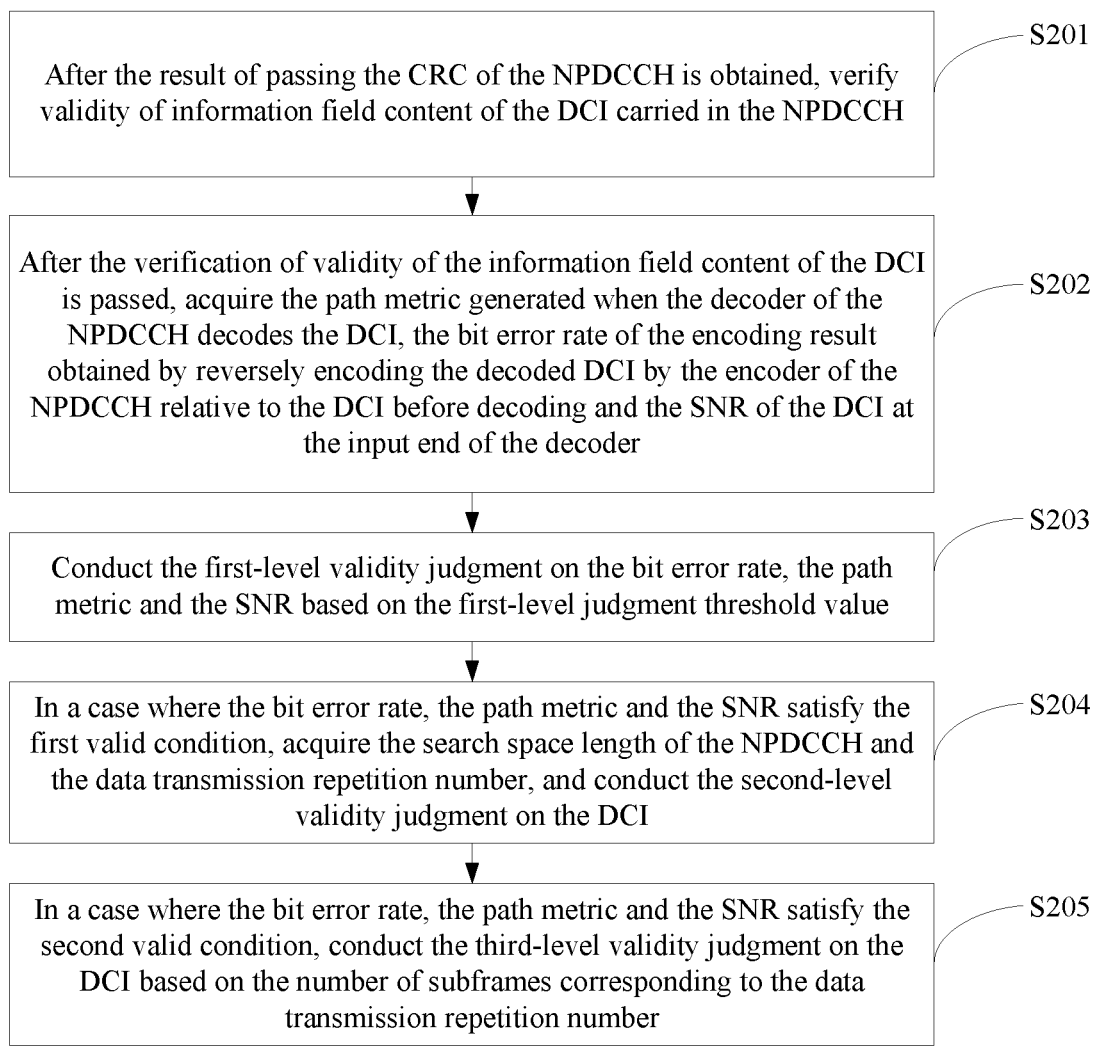
FIG. 3 is another flowchart of a detection method provided by the embodiments of the present disclosure.

The detection method provided by the embodiments of the present disclosure may be applied to a communication system shown in FIG. 1. The communication system includes a network side device 10 and a terminal 11. The network side device 10 may be any network side device that complies with the NB-IoT protocol standards. The terminal 11 may be any terminal that complies with the NB-IoT protocol standards, for example, the terminal 11 may be a smart phone, a tablet personal computer, a smart watch, a fitness tracker, a virtual reality device and an IoT sensor. The network side device 10 sends an NPDCCH to the terminal 11. The terminal 11 receives the NPDCCH and detects DCI carried in the NPDCCH, and receives downlink data or sends uplink data based on the DCI.

In order to make the purpose, technical solutions and advantages of the present disclosure clearer, the embodiments of the present disclosure will be described below in combination with the drawings in detail. It is to be noted that the embodiments in the present disclosure and the features in the embodiments may be combined under the condition of no conflicts.

It is to be noted that, the execution entity of the following method embodiments may be a detection apparatus. The detection apparatus may be realized as part or entirety of the terminal through software, hardware or the combination of software and hardware. The following method embodiments are illustrated taking that the execution entity is a terminal for example.

It is well known that the wireless environment of a terminal is complicated and changeable, for example, the terminal in remote meter reading services is usually under the ground surface and covered by a manhole cover, which makes the wireless environment of the terminal poor in quality and prone to an error detection of the DCI. If the terminal detects interference and noise signals and determines the interference and noise signals as valid DCI by error, the terminal will receive downlink data or send uplink data according to wrong scheduling information, which may cause serious misalignment with the actual scheduling process on the network side. As a result, a large number of unnecessary data retransmissions occur at a physical layer and a data link layer, which seriously affects the data throughput and transmission delay, and may lead to the abnormality of links due to data congestion. Therefore, the detection method and apparatus, the terminal and the storage medium provided by the embodiments of the present disclosure aim to further filter the detected DCI, so as to reduce the probability of error detection of the DCI.

FIG. 2 is a flowchart of a detection method provided by the embodiments of the present disclosure. As shown in FIG. 2, the method includes the following operations.

At S101, a decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI are acquired.

As an exemplary implementation, after obtaining a result that Cyclic Redundancy Check (CRC) of the NPDCCH is passed, the terminal acquires the decoding parameter, the comparison parameter and the SNR of the DCI. The decoding parameter is an intermediate result output in the process of decoding the DCI, which may be a path metric, a path metric accumulation or a grid graph generated in the process of decoding the DCI. The terminal may reversely encode the decoded DCI to obtain an encoding result, and compare the encoding result with the DCI before decoding, so as to obtain the comparison parameter. The comparison parameter may be a bit error rate between the encoding result obtained by reversely encoding the decoded DCI and the DCI before decoding, or a codeword distribution characteristic between the encoding result obtained by reversely encoding the decoded DCI and the DCI before decoding. Of course, the terminal may also select a part of codeword sets from the encoding result obtained by reversely encoding the decoded DCI and select a part of codeword sets from the DCI before decoding, and obtain the comparison parameter by comparing the difference between the two parts of codeword sets. The SNR is the SNR of the input symbols of the decoder.

As an exemplary implementation, before S101, the method may further include that: validity of information field content of the DCI carried in the NPDCCH is verified.

As an exemplary implementation, after obtaining the result that the CRC of the NPDCCH is passed, the terminal needs to verify the validity of information field content of the DCI carried in the NPDCCH. After the verification of validity is passed, S101 is executed. The process that the terminal verifies the validity of the information field content of the DCI may include that: the terminal parses the DCI to obtain the information field content of the DCI, compares the information field content of the DCI with DCI content specified by a protocol, and in a case where the information field content of the DCI does not comply with provisions of the protocol, determines that the validity verification of the information field content of the DCI is not passed, and in a case where the information field content of the DCI complies with the provisions of the protocol, determines that the validity verification of the information field content of the DCI is passed.

That the validity verification of the information field content of the DCI is passed may indicate that the DCI is a DCI complying with the provisions of the protocol according to the content of the protocol. In order to reduce the probability of error detection of the DCI, it is necessary to further judge the validity of the DCI.

In a case where the validity verification of the information field content of the DCI is not passed, it is determined that the DCI is invalid, and the DCI is discarded.

At S102, in a case where the decoding parameter, the comparison parameter and the SNR satisfy a first valid condition, a data transmission repetition number and a search space length of the NPDCCH are acquired.

First threshold values corresponding to the decoding parameter, the comparison parameter and the SNR may be obtained according to multiple simulation experiments, and the first threshold values obtained above are preset in the terminal. The first threshold values include a first preset decoding parameter threshold value, a first preset comparison parameter threshold value and a first preset SNR threshold value. In an exemplary implementation, the first valid condition may be set for the decoding parameter, the comparison parameter and the SNR respectively. In a case where the decoding parameter, the comparison parameter and the SNR respectively satisfy the corresponding first valid condition, it is indicated that the decoding parameter, the comparison parameter and the SNR satisfy the first valid condition. As an exemplary implementation, in a case where the decoding parameter is greater than or equal to the first preset decoding parameter threshold value, it is indicated that the decoding parameter satisfies the first valid condition. In a case where the comparison parameter is less than or equal to the first preset comparison parameter threshold value, it is indicated that the comparison parameter satisfies the first valid condition. In a case where the SNR is greater than or equal to the first preset SNR threshold value, it is indicated that the SNR satisfies the first valid condition. That is, in a case where the decoding parameter is greater than or equal to the first preset decoding parameter threshold value, the comparison parameter is less than or equal to the first preset comparison parameter threshold value, and the SNR is greater than or equal to the first preset SNR threshold value, it is indicated that the decoding parameter, the comparison parameter and the SNR satisfy the first valid condition. In a case where at least one of the decoding parameter, the comparison parameter or the SNR does not satisfy the corresponding first valid condition, it is indicated that the decoding parameter, the comparison parameter and the SNR do not satisfy the first valid condition.

In an alternative exemplary implementation, weight values corresponding to the decoding parameter, the comparison parameter and the SNR may be preset, the decoding parameter, the comparison parameter and the SNR are comprehensively calculated based on the weight values to obtain a comprehensive calculation result of the decoding parameter, the comparison parameter and the SNR, and the first preset parameter threshold values (including the first preset decoding parameter threshold value, the first preset comparison parameter threshold value and the first preset SNR threshold value) are comprehensively calculated to obtain a comprehensive calculation result of the first preset parameter threshold values. Then, the comprehensive calculation result of the decoding parameter, the comparison parameter and the SNR is compared with the comprehensive calculation result of the first preset parameter threshold values. In a case where the comprehensive calculation result of the decoding parameter, the comparison parameter and the SNR is greater than or equal to the comprehensive calculation result of the first preset parameter threshold values, it is indicated that the decoding parameter, the comparison parameter and the SNR satisfy the first valid condition. In a case where the comprehensive calculation result of the decoding parameter, the comparison parameter and the SNR is less than the comprehensive calculation result of the first preset parameter threshold values, it is indicated that the decoding parameter, the comparison parameter and the SNR do not satisfy the first valid condition. Through the above process, the terminal makes a first-level validity judgment on the DCI.

In the case where the decoding parameter, the comparison parameter and the SNR satisfy the first valid condition, the terminal may acquire a search space length $R_{max}$ of the NPDCCH through high-layer signaling, and acquire a data transmission repetition number through a corresponding set of resource allocation and scheduling parameters in the information field of the DCI. In a case where the format of the DCI is N0, the terminal acquires the uplink data transmission repetition number from the scheduling parameter "Repetition number". The value range of the uplink data transmission repetition number includes, but is not limited to, {1, 2, 4, 8, 16, 32, 64, 128}. In a case where the format of the DCI is N1, the terminal acquires the downlink data transmission repetition number from the scheduling parameter "Repetition number". The value range of the downlink data transmission repetition number includes, but is not limited to, {1, 2, 4, 8, 16, 32, 64, 128, 192, 256, 384, 512, 768, 1024, 1536, 2048}. In a case where the format of the DCI is N2, the terminal acquires the paging data transmission repetition number from the scheduling parameter "Repetition number". The value range of the paging data transmission repetition number includes, but is not limited to, {1, 2, 4, 8, 16, 32, 64, 128, 192, 256, 384, 512, 768, 1024, 1536, 2048}.

As an exemplary implementation, in a case where the decoding parameter, the comparison parameter and the SNR do not satisfy the first valid condition, it is determined that the DCI is invalid, and the DCI is discarded.

At S103, in a case where the search space length matches the number of subframes corresponding to the data transmission repetition number, it is determined that the DCI is valid.

As an exemplary implementation, the terminal may obtain the number of subframes occupied by data transmission based on the acquired data transmission repetition number, and determines whether the acquired search space length matches the number of subframes corresponding to the data transmission repetition number. In a case where the search space length matches the number of subframes corresponding to the data transmission repetition number, the terminal determines that the DCI is valid. That the DCI is valid means that the DCI is DCI valid for the terminal, in other words, the DCI is correct DCI corresponding to the terminal rather than other terminals.

As an exemplary implementation, a process of determining that the search space length matches the number of subframes corresponding to the data transmission repetition number may include that: a preset mismatch parameter corresponding to the DCI is acquired according to a format of the DCI; and in a case where the number of subframes corresponding to the data transmission repetition number is less than a product of the preset mismatch parameter and the search space length, it is determined that the search space length matches the number of subframes corresponding to the data transmission repetition number.

A user may preset the preset mismatch parameter corresponding to the DCI according to a format of the DCI. For example, the preset mismatch parameter corresponds to three DCI Formats, and a parameter reflecting the degree of mismatch between the search space length $R_{max}$ of the NPDCCH and the number of subframes corresponding to the data transmission repetition number may be preset as follows. The preset mismatch parameter $\alpha_{N0}$ corresponds to "DCI Format N0", the preset mismatch parameter $\alpha_{N1}$ corresponds to "DCI Format N1", and the preset mismatch parameter $\alpha_{N2}$ corresponds to "DCI Format N2". In a case where the DCI is of "DCI Format N0" and $N_{SF\_N0}$ is less than $\alpha_{N0}*R_{max}$, it is indicated that the search space length $R_{max}$ matches the number of subframes $N_{SF\_N0}$ corresponding to the data transmission repetition number. In a case where the DCI is of "DCI Format N1" and $N_{SF\_N1}$ is less than $\alpha_{N1}*R_{max}$, it is indicated that the search space length $R_{max}$ matches the number of subframes $N_{SF\_N1}$ corresponding to the data transmission repetition number. In a case where the DCI is of "DCI Format N2" and $N_{SF\_N2}$ is less than $\alpha_{N2}*R_{max}$, it is indicated that the search space length $R_{max}$ matches the number of subframes $N_{SF\_N2}$ corresponding to the data transmission repetition number.

On the contrary, in a case where the DCI is of "DCI Format N0" and $N_{SF\_N0}$ is greater than or equal to $\alpha_{N0}*R_{max}$, it is indicated that the search space length $R_{max}$ does not match the number of subframes $N_{SF\_N0}$ corresponding to the data transmission repetition number. In a case where the DCI is of "DCI Format N1" and $N_{SF\_N1}$ is greater than or equal to $\alpha_{N1}*R_{max}$, it is indicated that the search space length $R_{max}$ does not match the number of subframes $N_{SF\_N1}$ corresponding to the data transmission repetition number. In a case where the DCI is of "DCI Format N2" and $N_{SF\_N2}$ is greater than or equal to $\alpha_{N2}*R_{max}$, it is indicated that the search space length $R_{max}$ does not match the number of subframes $N_{SF\_N2}$ corresponding to the data transmission repetition number.

In the detection method provided by the embodiments of the present disclosure, the terminal acquires the decoding parameter in the process that the decoder of the NPDCCH decodes the DCI, the comparison parameter obtained by comparing the encoding result obtained by reversely encoding the decoded DCI by the encoder of the NPDCCH with the DCI before decoding, and the SNR of the DCI, in the case where the decoding parameter, the comparison parameter and the SNR satisfy the first valid condition, acquires the data transmission repetition number and the search space length of the NPDCCH, and in the case where the search space length matches the number of subframes corresponding to the data transmission repetition number, determines that the DCI is valid. That is, the terminal conducts two levels of validity judgment on the detected DCI, and determines that the DCI is valid in a case where both the two levels of validity judgment satisfy the corresponding condition. In this way, the probability of error detection of the DCI is reduced, and the accuracy of a DCI detection result is improved. Moreover, in the process of detecting the DCI, a matching relationship between the search space length of the NPDCCH and the number of subframes corresponding to the data transmission repetition number is considered, thus further improving the accuracy of a DCI detection result.

As an exemplary implementation, in a case where the search space length does not match the number of subframes corresponding to the data transmission repetition number, the method may further include that: in a case where the decoding parameter, the comparison parameter and the SNR satisfy a second valid condition, it is determined that the DCI is valid. The second valid condition is prior to the first valid condition.

As an exemplary implementation, second threshold values corresponding to the decoding parameter, the comparison parameter and the SNR may also be obtained according to multiple simulation experiments, and the second threshold values obtained above are preset in the terminal. The second threshold values include a second preset decoding parameter threshold value, a second preset comparison parameter threshold value and a second preset SNR threshold value. The second preset decoding parameter threshold value is greater than the first preset decoding parameter threshold value, the second preset comparison parameter threshold value is greater than the first preset comparison parameter threshold value, and the second preset SNR threshold value is greater than the first preset SNR threshold value. It is understandable that, in a case where the search space length does not match the number of subframes corresponding to the data transmission repetition number, the second threshold values corresponding to the decoding parameter, the comparison parameter and the SNR may be set higher than the corresponding first threshold values, so as to tighten the condition for judging the validity of the DCI and further determine the validity of the DCI.

In an exemplary implementation, the second valid condition may be set for the decoding parameter, the comparison parameter and the SNR respectively. In a case where the decoding parameter, the comparison parameter and the SNR satisfy the corresponding second valid condition, it is indicated that the decoding parameter, the comparison parameter and the SNR satisfy the second valid condition. As an exemplary implementation, in a case where the decoding parameter is greater than or equal to the second preset decoding parameter threshold value, it is indicated that the decoding parameter satisfies the second valid condition. In a case where the comparison parameter is less than or equal to the second preset comparison parameter threshold value, it is indicated that the comparison parameter satisfies the second valid condition. In a case where the SNR is greater than or equal to the second preset SNR threshold value, it is indicated that the SNR satisfies the second valid condition. That is, in a case where the decoding parameter is greater than or equal to the second preset decoding parameter threshold value, the comparison parameter is less than or equal to the second preset comparison parameter threshold value, and the SNR is greater than or equal to the second preset SNR threshold value, it is indicated that the decoding parameter, the comparison parameter and the SNR satisfy the second valid condition. In a case where at least one of the decoding parameter, the comparison parameter or the SNR does not satisfy the corresponding second valid condition, it is indicated that the decoding parameter, the comparison parameter and the SNR do not satisfy the second valid condition.

In an alternative exemplary implementation, the decoding parameter, the comparison parameter and the SNR are comprehensively calculated based on the preset weight values corresponding to the decoding parameter, the comparison parameter and the SNR to obtain the comprehensive calculation result of the decoding parameter, the comparison parameter and the SNR, and the second preset parameter threshold values (including the second preset decoding parameter threshold value, the second preset comparison parameter threshold value and the second preset SNR threshold value) are comprehensively calculated to obtain the comprehensive calculation result of the second preset parameter threshold values. Then, the comprehensive calculation result of the decoding parameter, the comparison parameter and the SNR is compared with the comprehensive calculation result of the second preset parameter threshold values. In a case where the comprehensive calculation result of the decoding parameter, the comparison parameter and the SNR is greater than or equal to the comprehensive calculation result of the second preset parameter threshold values, it is indicated that the decoding parameter, the comparison parameter and the SNR satisfy the second valid condition. In a case where the comprehensive calculation result of the decoding parameter, the comparison parameter and the SNR is less than the comprehensive calculation result of the second preset parameter threshold values, it is indicated that the decoding parameter, the comparison parameter and the SNR do not satisfy the second valid condition. Through the above process, the terminal makes second-level validity judgment on the DCI.

As an exemplary implementation, in a case where the decoding parameter, the comparison parameter and the SNR do not satisfy the second valid condition, it is determined that the DCI is invalid, and the DCI is discarded.

In the embodiment, in a case where the search space length does not match the number of subframes corresponding to the data transmission repetition number, the terminal may further determine the validity of the DCI based on whether the decoding parameter, the comparison parameter and the SNR satisfy the second valid condition. That is, the terminal conducts two levels of validity judgment on the detected DCI, and the condition of the second-level validity judgment is higher than the condition of the first-level validity judgment. In a case where both the two levels of validity judgment satisfy the corresponding condition, the terminal determines that the DCI is valid. In this way, the probability of error detection of the DCI is further reduced, and the accuracy of a DCI detection result is further improved.

In order to further reduce the probability of error detection of the DCI, the terminal may further conduct third-level validity judgment on the DCI according to the number of subframes corresponding to the data transmission repetition number. In an exemplary implementation, in a case where the decoding parameter, the comparison parameter and the SNR satisfy the second valid condition, the process of determining that the DCI is valid may include that: in a case where the decoding parameter, the comparison parameter and the SNR satisfy the second valid condition, and the number of subframes corresponding to the data transmission repetition number is less than the preset threshold value, it is determined that the DCI is valid.

As an exemplary implementation, when the third-level validity judgment is conducted on the DCI, in a case where the terminal determines that the number of subframes corresponding to the data transmission repetition number is less than the preset threshold value, and the result of the second-level validity judgment is that the decoding parameter, the comparison parameter and the SNR satisfy the second valid condition, it is determined that the result of the third-level validity judgment is that the DCI is valid. The user may preset the preset threshold value corresponding to the DCI according to a format of the DCI (the preset threshold value may indicate the possibility of misalignment occurring between the actual scheduling processes of the terminal and the network side). For example, the preset threshold value corresponds to three DCI Formats, the preset threshold value $\beta_{N0}$ corresponds to "DCI Format N0", the preset threshold value $\beta_{N1}$ corresponds to "DCI Format N1", and the preset threshold value $\beta_{N2}$ corresponds to "DCI Format N2". That is, the terminal selects the corresponding preset threshold value according to the format of the detected DCI to conduct the third-level validity judgment. In a case where the DCI is of "DCI Format N0", if $N_{SF\_N0}$ is less than $\beta_{N0}$, and the decoding parameter, the comparison parameter and the SNR satisfy the second valid condition, it is indicated that the DCI is valid. In a case where the DCI is of "DCI Format N1", if $N_{SF\_N1}$ is less than $\beta_{N1}$, and the decoding parameter, the comparison parameter and the SNR satisfy the second valid condition, it is indicated that the DCI is valid. In a case where the DCI is of "DCI Format N2", if $N_{SF\_N2}$ is less than $<\beta_{N2}$, and the decoding parameter, the comparison parameter and the SNR satisfy the second valid condition, it is indicated that the DCI is valid.

In an alternative exemplary implementation, the process of determining, in a case where the number of subframes corresponding to the data transmission repetition number is greater than or equal to a preset threshold value, that the DCI is valid may include that: in a case where the decoding parameter, the comparison parameter and the SNR satisfy the third valid condition, it is determined that the DCI is valid. The third valid condition is prior to the second valid condition.

Third threshold values corresponding to the decoding parameter, the comparison parameter and the SNR may be preset (the third threshold values may also be obtained according to multiple simulation experiments). The third threshold values include a third preset decoding parameter threshold value, a third preset comparison parameter threshold value and a third preset SNR threshold value. The third preset decoding parameter threshold value is greater than the second preset decoding parameter threshold value, the third preset comparison parameter threshold value is greater than the second preset comparison parameter threshold value, and the third preset SNR threshold value is greater than the second preset SNR threshold value. It is understandable that, in a case where the number of subframes corresponding to the data transmission repetition number is greater than or equal to a preset threshold value, the third threshold values corresponding to the decoding parameter, the comparison parameter and the SNR may be set higher than the corresponding second threshold values, so as to tighten the condition for judging the validity of the DCI and further determine the validity of the DCI.

In an exemplary implementation, the third valid condition may be set for the decoding parameter, the comparison parameter and the SNR respectively. In a case where the decoding parameter, the comparison parameter and the SNR satisfy the corresponding third valid condition, it is indicated that the decoding parameter, the comparison parameter and the SNR satisfy the third valid condition. As an exemplary implementation, in a case where the decoding parameter is greater than or equal to the third preset decoding parameter threshold value, it is indicated that the decoding parameter satisfies the third valid condition. In a case where the comparison parameter is less than or equal to the third preset comparison parameter threshold value, it is indicated that the comparison parameter satisfies the third valid condition. In a case where the SNR is greater than or equal to the third preset SNR threshold value, it is indicated that the SNR satisfies the third valid condition. That is, in a case where the decoding parameter is greater than or equal to the third preset decoding parameter threshold value, the comparison parameter is less than or equal to the third preset comparison parameter threshold value, and the SNR is greater than or equal to the third preset SNR threshold value, it is indicated that the decoding parameter, the comparison parameter and the SNR satisfy the third valid condition. In a case where at least one of the decoding parameter, the comparison parameter or the SNR does not satisfy the corresponding third valid condition, it is indicated that the decoding parameter, the comparison parameter and the SNR do not satisfy the third valid condition.

In an alternative exemplary implementation, the decoding parameter, the comparison parameter and the SNR are comprehensively calculated based on the preset weight values corresponding to the decoding parameter, the comparison parameter and the SNR to obtain the comprehensive calculation result of the decoding parameter, the comparison parameter and the SNR, and the third preset parameter threshold values (including the third preset decoding parameter threshold value, the third preset comparison parameter threshold value and the third preset SNR threshold value) are comprehensively calculated to obtain the comprehensive calculation result of the third preset parameter threshold values. Then, the comprehensive calculation result of the decoding parameter, the comparison parameter and the SNR is compared with the comprehensive calculation result of the third preset parameter threshold values. In a case where the comprehensive calculation result of the decoding parameter, the comparison parameter and the SNR is greater than or equal to the comprehensive calculation result of the third preset parameter threshold values, it is indicated that the decoding parameter, the comparison parameter and the SNR satisfy the third valid condition. In a case where the comprehensive calculation result of the decoding parameter, the comparison parameter and the SNR is less than the comprehensive calculation result of the third preset parameter threshold values, it is indicated that the decoding parameter, the comparison parameter and the SNR do not satisfy the third valid condition.

As an exemplary implementation, in a case where the decoding parameter, the comparison parameter and the SNR do not satisfy the third valid condition, it is determined that the DCI is invalid, and the DCI is discarded.

In the embodiment, the terminal may further conduct the third-level validity judgment according to the number of subframes corresponding to the data transmission repetition number. In a case where the decoding parameter, the comparison parameter and the SNR satisfy the second valid condition, if the number of subframes corresponding to the data transmission repetition number less than the preset threshold value, it is determined that the DCI is valid; and if the number of subframes corresponding to the data transmission repetition number is greater than or equal to the preset threshold value, it is needed to judge whether the decoding parameter, the comparison parameter and the SNR satisfy the third valid condition, so as to determine the validity of the DCI. That is, the terminal conducts three levels of validity judgment on the detected DCI, and the condition of the third-level validity judgment is prior to the condition of the first-level validity judgment and the condition of the second-level validity judgment. In a case where all the three levels of validity judgment satisfy the corresponding condition, the terminal determines that the DCI is valid. In this way, the probability of error detection of the DCI is further reduced, and the accuracy of a DCI detection result is further improved. In this way, when the terminal performs data scheduling based on the accurate and valid DCI, the probability of data retransmission can be reduced and the data transmission delay can be shortened.

Figure 4:
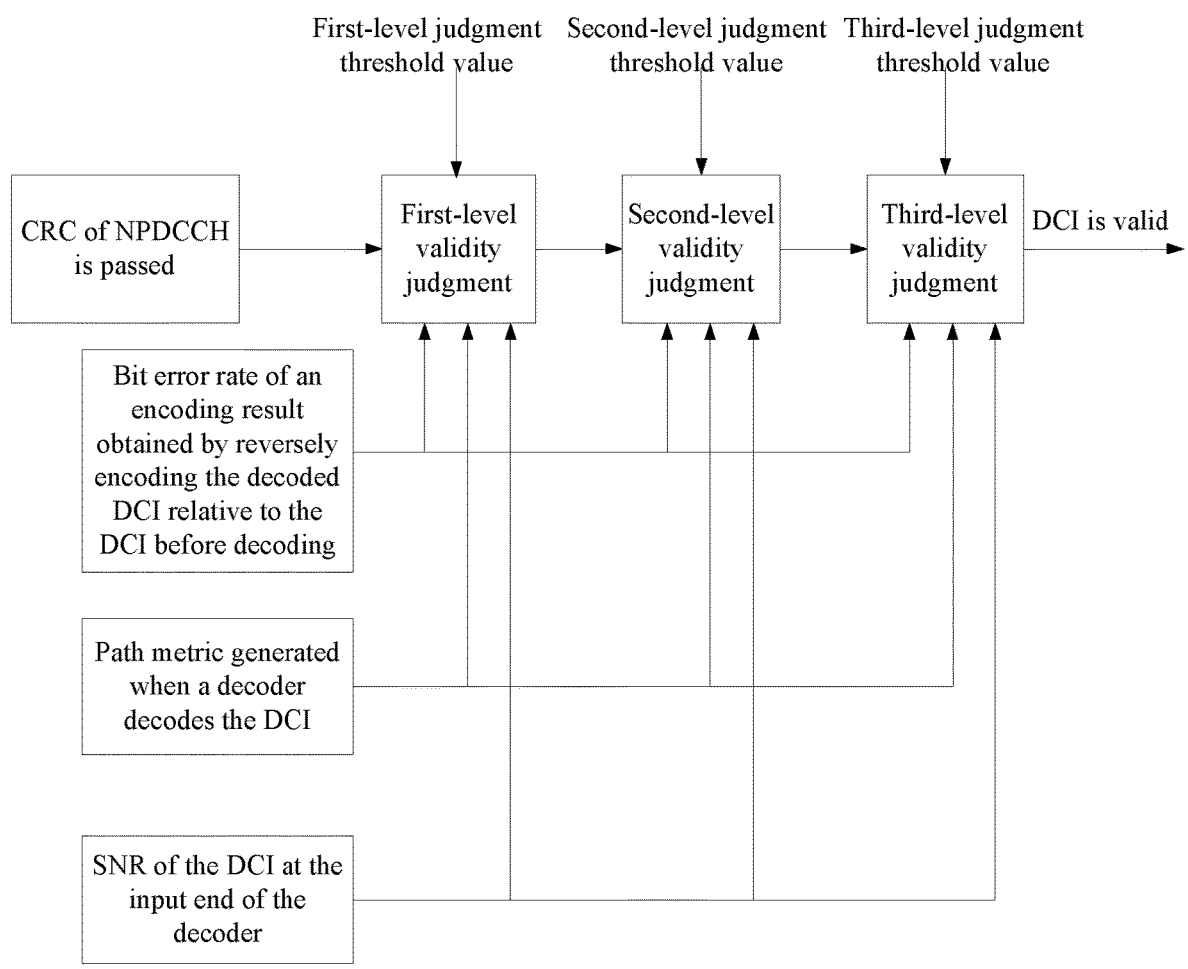
FIG. 4 is yet another flowchart of a detection method provided by the embodiments of the present disclosure.

In order to facilitate the understanding of those having ordinary skill in the art, the process of detecting the DCI is introduced taking that the decoding parameter is a path metric and the comparison parameter is a bit error rate for example. Therefore, a first-level judgment threshold value (a first bit error rate threshold value, a first path metric threshold value and a first SNR threshold value), a second-level judgment threshold value (a second bit error rate threshold value, a second path metric threshold value and a second SNR threshold value), and a third-level judgment threshold value (a third bit error rate threshold value, a third path metric threshold value and a third SNR threshold value) are preset. The third-level judgment threshold value is greater than the second-level judgment threshold value, and the second-level judgment threshold value is greater than the first-level judgment threshold value. As shown in FIG. 3 and FIG. 4, the method includes the following operations.

At S201, after the result that the CRC of the NPDCCH is passed is obtained, validity of information field content of the DCI carried in the NPDCCH is verified.

At S202, after the verification of validity of the information field content of the DCI is passed, the path metric generated when the decoder of the NPDCCH decodes the DCI, the bit error rate of the encoding result obtained by reversely encoding the decoded DCI by the encoder of the NPDCCH relative to the DCI before decoding and the SNR of the DCI at the input end of the decoder are acquired.

At S203, the first-level validity judgment is conducted on the bit error rate, the path metric and the SNR based on first-level judgment threshold values.

As an exemplary implementation, in a case where the bit error rate is less than or equal to a first bit error rate threshold value, the path metric is greater than or equal to a first path metric threshold value, and the SNR is greater than or equal to a first SNR threshold value, it is determined that the bit error rate, the path metric and the SNR satisfy the first valid condition.

In a case where the bit error rate is greater than the first bit error rate threshold value, and/or the path metric is less than the first path metric threshold value, and/or the SNR is less than the first SNR threshold value, it is determined that the bit error rate, the path metric and the SNR do not satisfy the first valid condition.

As an alternative exemplary implementation, a normalized value $r_{BER\_L1}$ between the bit error rate and the first bit error rate threshold value, a normalized value $r_{PM\_L1}$ between the path metric and the first path metric threshold value and a normalized value $r_{SNR\_L1}$ between the SNR and the first SNR threshold value are calculated respectively, a first-level basic judgment variable $D_1$ is calculated by formula $\delta_{BER\_L1} \times r_{BER\_L1} + \delta_{PM\_L1} \times r_{PM\_L1} + \delta_{SNR\_L1} \times r_{SNR\_L1}$ based on preset weight values $\delta_{BER\_L1}$, $\delta_{PM\_L1}$ and $\delta_{SNR\_L1}$, and $D_1$ is compared with the corresponding threshold value. In a case where $D_1$ is greater than or equal to the threshold value, it is determined that the bit error rate, the path metric and the SNR satisfy the first valid condition. In a case where $D_1$ is less than the threshold value, it is determined that the bit error rate, the path metric and the SNR do not satisfy the first valid condition. The threshold value may be calculated based on the first-level judgment threshold values and the corresponding weight values.

At S204, in a case where the bit error rate, the path metric and the SNR satisfy the first valid condition, the search space length of the NPDCCH and the data transmission repetition number are acquired, and the second-level validity judgment is conducted on the DCI.

In a case where the search space length matches the number of subframes corresponding to the data transmission repetition number, it is determined that the DCI is valid. In a case where the search space length does not match the number of subframes corresponding to the data transmission repetition number, the second-level validity judgment is conducted on the bit error rate, the path metric and the SNR based on the second-level judgment threshold values. As an exemplary implementation, according to the format of the detected DCI, the preset mismatch parameter corresponding to the DCI in the format may be acquired. In a case where the number of subframes corresponding to the data transmission repetition number is less than a product of the preset mismatch parameter and the search space length, it is determined that the search space length matches the number of subframes corresponding to the data transmission repetition number indicated by the DCI. In a case where the number of subframes corresponding to the data transmission repetition number is greater than or equal to the product of the preset mismatch parameter and the search space length, it is determined that the search space length does not match the number of subframes corresponding to the data transmission repetition number indicated by the DCI.

It is to be noted that the specific description about the situation that the search space length matches the number of subframes corresponding to the data transmission repetition number may refer to the description of the above embodiments. In addition, the process that the terminal conducts the second-level validity judgment on the bit error rate, the path metric and the SNR based on the second-level judgment threshold values may refer to the process that the terminal conducts the first-level validity judgment on the bit error rate, the path metric and the SNR based on the first-level judgment threshold values. Elaborations are omitted herein.

At S205, in a case where the bit error rate, the path metric and the SNR satisfy the second valid condition, the third-level validity judgment is conducted on the DCI based on the number of subframes corresponding to the data transmission repetition number.

In a case where the bit error rate, the path metric and the SNR satisfy the second valid condition, the third-level validity judgment is conducted on the DCI. As an exemplary implementation, the number of subframes corresponding to the data transmission repetition number is compared with a preset threshold value (which may indicate the possibility of misalignment occurring between the actual scheduling processes of the terminal and the network side). In a case where the number of subframes corresponding to the data transmission repetition number is less than the preset threshold value, it is determined that the DCI is valid. In a case where the number of subframes corresponding to the data transmission repetition number is greater than or equal to a preset threshold value, the third-level validity judgment is conducted on the bit error rate, the path metric and the SNR based on the third-level judgment threshold value. In a case where the decoding parameter, the comparison parameter and the SNR satisfy the third valid condition, it is determined that the DCI is valid.

It is to be noted that the process that the terminal conducts the third-level validity judgment on the bit error rate, the path metric and the SNR based on the third-level judgment threshold values may refer to the process that the terminal conducts the first-level validity judgment on the bit error rate, the path metric and the SNR based on the first-level judgment threshold values. Elaborations are omitted herein.

In the embodiment, the terminal conducts three levels of validity judgment on the detected DCI, and the condition of the third-level validity judgment is prior to the condition of the first-level validity judgment and the condition of the second-level validity judgment. In a case where all the three levels of validity judgment satisfy the corresponding condition, the terminal determines that the DCI is valid. In this way, the probability of error detection of the DCI is further reduced, and the accuracy of a DCI detection result is further improved. In this way, when the terminal performs data scheduling based on the accurate and valid DCI, the probability of data retransmission can be reduced and the data transmission delay can be shortened.

Figure 5:
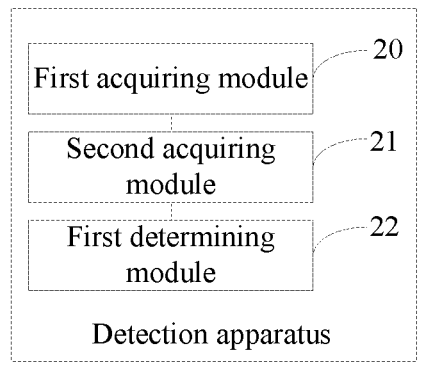
FIG. 5 is a structure diagram of a detection apparatus provided by the embodiments of the present disclosure.

FIG. 5 is a structure diagram of a detection apparatus provided by the embodiments of the present disclosure. As shown in FIG. 5, the detection apparatus includes a first acquiring module 20, a second acquiring module 21 and a first determining module 22.

As an exemplary implementation, the first acquiring module 20 is configured to acquire a decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI.

The second acquiring module 21 is configured to acquire, in a case where the decoding parameter, the comparison parameter and the SNR satisfy a first valid condition, a data transmission repetition number and a search space length of the NPDCCH.

The first determining module 22 is configured to determine that the DCI is valid in a case where the search space length matches the number of subframes corresponding to the data transmission repetition number.

With the detection apparatus provided by the embodiments of the present disclosure, the terminal acquires the decoding parameter in a process that the decoder of the NPDCCH decodes the DCI, the comparison parameter obtained by comparing the encoding result obtained by reversely encoding the decoded DCI by the encoder of the NPDCCH with the DCI before decoding, and the SNR of the DCI, in the case where the decoding parameter, the comparison parameter and the SNR satisfy the first valid condition, acquires a data transmission repetition number and a search space length of the NPDCCH, and in a case where the search space length matches the number of subframes corresponding to the data transmission repetition number, determines that the DCI is valid. That is, the terminal conducts two levels of validity judgment on the detected DCI, and determines that the DCI is valid in a case where both the two levels of validity judgment satisfy the corresponding condition. In this way, the probability of error detection of the DCI is reduced, and the accuracy of a DCI detection result is improved. Moreover, in the process of detecting the DCI, the matching relationship between the search space length of the NPDCCH and the number of subframes corresponding to the data transmission repetition number is considered, thus further improving the accuracy of a DCI detection result.

Based on the above embodiments, as an exemplary implementation, the detection apparatus may further include a second determining module.

As an exemplary implementation, in a case where the search space length does not match the number of subframes corresponding to the data transmission repetition number, the second determining module is configured to determine that the DCI is valid in a case where the decoding parameter, the comparison parameter and the SNR satisfy the second valid condition. The second valid condition is prior to the first valid condition.

Based on the above embodiments, as an exemplary implementation, the second determining module is configured to determine that the DCI is valid in a case where the decoding parameter, the comparison parameter and the SNR satisfy the second valid condition, and the number of subframes corresponding to the data transmission repetition number is less than the preset threshold value.

Based on the above embodiments, as an exemplary implementation, in a case where the number of subframes corresponding to the data transmission repetition number is greater than or equal to a preset threshold value, the second determining module is configured to determine that the DCI is valid in a case where the decoding parameter, the comparison parameter and the SNR satisfy the third valid condition. The third valid condition is prior to the second valid condition.

Based on the above embodiments, as an exemplary implementation, the second determining module is further configured to determine that the DCI is invalid and discard the DCI in a case where the decoding parameter, the comparison parameter and the SNR do not satisfy the second valid condition.

Based on the above embodiments, as an exemplary implementation, the detection apparatus may further include a validity verifying module.

As an exemplary implementation, the validity verifying module is configured to verify validity of information field content of the DCI carried in the NPDCCH before the first acquiring module 20 acquires the decoding parameter in the process that the decoder of the NPDCCH decodes the DCI, the comparison parameter obtained by comparing the encoding result obtained by reversely encoding the decoded DCI by the encoder of the NPDCCH with the DCI before decoding, and the SNR of the DCI.

Based on the above embodiments, as an exemplary implementation, the first determining module 22 is configured to acquire a preset mismatch parameter corresponding to the DCI according to a format of the DCI, and in a case where the number of subframes corresponding to the data transmission repetition number is less than a product of the preset mismatch parameter and the search space length, determine that the search space length matches the number of subframes corresponding to the data transmission repetition number.

As an exemplary implementation, the decoding parameter is the path metric, and the comparison parameter is the bit error rate.

Figure 6:
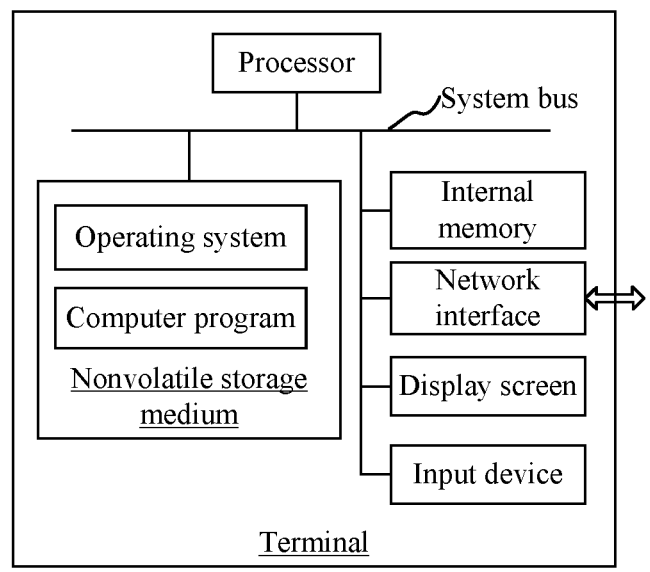
FIG. 6 is a structure diagram of a terminal provided by the embodiments of the present disclosure.

In an embodiment, a terminal is provided, an internal structure diagram of which is shown in FIG. 6. The terminal includes a processor, a memory, a network interface, a display screen and an input device connected through a system bus. The processor of the terminal is used to provide computing and control capabilities. The memory of the terminal includes a non-volatile storage medium and an internal memory. The non-volatile storage medium stores an operating system and a computer program. The internal memory provides an environment for the operation of the operating system and the computer program in the non-volatile storage medium. The network interface of the terminal is used to communicate with an external device through a network connection. When executed by the processor, the computer program implements a detection method. The display screen of the terminal may be an LCD or an e-ink display screen. The input device of the terminal may be a touch layer covered on the display screen, a button, trackball or trackpad set on the case of the terminal, an external keyboard, trackpad or mouse, etc.

Those having ordinary skill in the art may understand that the structure shown in FIG. 6 is only a block diagram of part of the structure related to the solutions of the embodiments of the present disclosure and does not constitute a limitation on the terminal applied to the solutions of the embodiments of the present disclosure. Specifically, the terminal may include more or fewer parts than shown in the figures, or some combination of parts, or a different arrangement of parts.

In an embodiment, a terminal is provided, which includes a memory and a processor. The memory stores a computer program. When executing the computer program, the processor implements following operations.

A decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI are acquired.

In a case where the decoding parameter, the comparison parameter and the SNR satisfy a first valid condition, a data transmission repetition number and a search space length of the NPDCCH are acquired.

In a case where the search space length matches the number of subframes corresponding to the data transmission repetition number, it is determined that the DCI is valid.

In an embodiment, in a case where the search space length does not match the number of subframes corresponding to the data transmission repetition number, the processor further implements the following operation when executing the computer program: in a case where the decoding parameter, the comparison parameter and the SNR satisfy the second valid condition, it is determined that the DCI is valid. The second valid condition is prior to the first valid condition.

In an embodiment, the processor further implements the following operation when executing the computer program: in a case where the decoding parameter, the comparison parameter and the SNR satisfy the second valid condition, and the number of subframes corresponding to the data transmission repetition number is less than the preset threshold value, it is determined that the DCI is valid.

In an embodiment, in a case where the number of subframes corresponding to the data transmission repetition number is greater than or equal to a preset threshold value, the processor further implements the following operation when executing the computer program: in a case where the decoding parameter, the comparison parameter and the SNR satisfy the third valid condition, it is determined that the DCI is valid. The third valid condition is prior to the second valid condition.

In an embodiment, the processor further implements the following operation when executing the computer program: in a case where the decoding parameter, the comparison parameter and the SNR do not satisfy the second valid condition, it is determined that the DCI is invalid, and the DCI is discarded.

In an embodiment, the processor further implements the following operation when executing the computer program: validity of information field content of the DCI carried in the NPDCCH is verified.

In an embodiment, the processor further implements the following operations when executing the computer program. A preset mismatch parameter corresponding to the DCI is acquired according to a format of the DCI. In a case where the number of subframes corresponding to the data transmission repetition number is less than a product of the preset mismatch parameter and the search space length, it is determined that the search space length matches the number of subframes corresponding to the data transmission repetition number.

As an exemplary implementation, the decoding parameter is the path metric, and the comparison parameter is the bit error rate.

In an embodiment, a computer-readable storage medium is provided, which stores a computer program. When executed by the processor, the computer program implements the following operations.

A decoding parameter in a process that a decoder of an NPDCCH decodes DCI, a comparison parameter obtained by comparing an encoding result obtained by reversely encoding the decoded DCI by an encoder of the NPDCCH with the DCI before decoding, and an SNR of the DCI are acquired.

In a case where the decoding parameter, the comparison parameter and the SNR satisfy a first valid condition, a data transmission repetition number and a search space length of the NPDCCH are acquired.

In a case where the search space length matches the number of subframes corresponding to the data transmission repetition number, it is determined that the DCI is valid.

In an embodiment, in a case where the search space length does not match the number of subframes corresponding to the data transmission repetition number, the computer program further implements the following operation when executed by the processor: in a case where the decoding parameter, the comparison parameter and the SNR satisfy a second valid condition, it is determined that the DCI is valid. The second valid condition is prior to the first valid condition.

In an embodiment, the computer program further implements the following operation when executed by the processor: in a case where the decoding parameter, the comparison parameter and the SNR satisfy the second valid condition, and the number of subframes corresponding to the data transmission repetition number is less than the preset threshold value, it is determined that the DCI is valid.

In an embodiment, in a case where the number of subframes corresponding to the data transmission repetition number is greater than or equal to a preset threshold value, the computer program further implements the following operation when executed by the processor: in a case where the decoding parameter, the comparison parameter and the SNR satisfy the third valid condition, it is determined that the DCI is valid. The third valid condition is prior to the second valid condition.

In an embodiment, the computer program further implements the following operation when executed by the processor: in a case where the decoding parameter, the comparison parameter and the SNR do not satisfy the second valid condition, it is determined that the DCI is invalid, and the DCI is discarded.

In an embodiment, the computer program further implements the following operation when executed by the processor: the validity of the information field content of the DCI carried in the NPDCCH is verified.

In an embodiment, the computer program further implements the following operations when executed by the processor. A preset mismatch parameter corresponding to the DCI is acquired according to a format of the DCI. In a case where the number of subframes corresponding to the data transmission repetition number is less than a product of the preset mismatch parameter and the search space length, it is determined that the search space length matches the number of subframes corresponding to the data transmission repetition number.

As an exemplary implementation, the decoding parameter is the path metric, and the comparison parameter is the bit error rate.

The detection apparatus, the terminal and the storage medium provided in the above embodiments can perform the detection method provided in any embodiment of the present disclosure, and have the corresponding functional modules for executing the method and beneficial effects. The technical details not described in detail in the above embodiments may refer to the detection method provided in any embodiment of the present disclosure.

The above is only the exemplary embodiments of the application and not intended to limit the protection scope of the application.

Those having ordinary skill in the art should understand that the term user terminal covers any suitable type of wireless user device, such as a mobile phone, a portable data processing device, a portable Web browser, or a vehicle-mounted mobile station.

Generally speaking, multiple embodiments of the present disclosure may be implemented in hardware or dedicated circuits, software, logic or any combination thereof. For example, some aspects may be implemented in hardware, while other aspects may be implemented in firmware or software that may be executed by a controller, a microprocessor, or other computing devices, although the present disclosure is not limited to this.

The embodiments of the present disclosure may be implemented by executing computer program instructions by a data processor of a mobile device, for example, in a processor entity, or through hardware, or through a combination of software and hardware. The computer program instructions may be assembly instructions, Instruction Set Architecture (ISA) instructions, machine instructions, machine-related instructions, microcode, firmware instructions, state setting data, or source codes or object codes written in any combination of one or more programming languages.

A block diagram of any logical flow in the accompanying drawings of the present disclosure may represent process operations, or interconnected logical circuits, modules and functions, or a combination of the process operations and the logical circuits, modules and functions. The computer program may be stored in the memory. The memory may have any type suitable for the local technical environment and may be implemented using any suitable data storage technology, such as but not limited to a Read-Only Memory (ROM), a Random Access Memory (RAM), an optical storage device and system (DVD or CD), etc. The computer-readable media may include non-transient storage media. The data processor may be any type suitable for the local technical environment, such as but not limited to a general-purpose computer, a special-purpose computer, a microprocessor, a Digital Signal Processor (DSP), an Application-Specific Integrated Circuit (ASIC), a Field Programmable Gate Array (FGPA), and a processor based on a multi-core processor architecture.

The exemplary embodiments of the present disclosure have been described in detail above through demonstrative and non-restrictive examples. However, with reference to the accompanying drawings and claims, various modifications and adjustments to the above embodiments are obvious to those having ordinary skill in the art, but do not depart from the scope of the present disclosure. Therefore, the proper scope of the present disclosure will be determined by the claims.

What is claimed is:

1. A detection method, comprising:
   acquiring a decoding parameter in a process that a decoder of a Narrowband Physical Downlink Control Channel (NPDCCH) decodes Downlink Control Information (DCI), a comparison parameter obtained by comparing an encoding result obtained by reversely encoding the decoded DCI by an encoder of the NPDCCH with the DCI before decoding, and a Signal-to-Noise Ratio (SNR) of the DCI;
   in a case where the decoding parameter, the comparison parameter and the SNR satisfy a first valid condition, acquiring a data transmission repetition number and a search space length of the NPDCCH; and
   in a case where the search space length matches the number of subframes corresponding to the data transmission repetition number, determining that the DCI is valid.

2. The method according to claim 1, wherein in a case where the search space length does not match the number of subframes corresponding to the data transmission repetition number, the method further comprises:
   in a case where the decoding parameter, the comparison parameter and the SNR satisfy a second valid condition, determining that the DCI is valid, wherein the second valid condition is prior to the first valid condition.

3. The method according to claim 2, wherein in a case where the decoding parameter, the comparison parameter and the SNR satisfy the second valid condition, determining that the DCI is valid comprises:
   in a case where the decoding parameter, the comparison parameter and the SNR satisfy the second valid condition, and the number of subframes corresponding to the data transmission repetition number is less than a preset threshold value, determining that the DCI is valid.

4. The method according to claim 2, wherein in a case where the number of subframes corresponding to the data transmission repetition number is greater than or equal to a preset threshold value, the method further comprises:
   in a case where the decoding parameter, the comparison parameter and the SNR satisfy a third valid condition, determining that the DCI is valid, wherein the third valid condition is prior to the second valid condition.

5. The method according to claim 4, further comprising:
   in a case where the decoding parameter, the comparison parameter and the SNR do not satisfy the third valid condition, determining that the DCI is invalid, and discarding the DCI.

6. The method according to claim 4, wherein a process of determining that the decoding parameter, the comparison parameter and the SNR satisfy a third valid condition comprises:
   in a case where the decoding parameter, the comparison parameter and the SNR respectively satisfy the corresponding third valid condition, determining that the decoding parameter, the comparison parameter and the SNR satisfy the third valid condition, wherein the third valid condition is set for the decoding parameter, the comparison parameter and the SNR respectively;
   or,
   comprehensively calculating the decoding parameter, the comparison parameter and the SNR based on weight values respectively corresponding to the decoding parameter, the comparison parameter and the SNR to obtain a comprehensive calculation result of the decoding parameter, the comparison parameter and the SNR; comprehensively calculating third preset parameter threshold values to obtain a comprehensive calculation result of the third preset parameter threshold values; comparing the comprehensive calculation result of the decoding parameter, the comparison parameter and the SNR with the comprehensive calculation result of the third preset parameter threshold values; and in a case where the comprehensive calculation result of the decoding parameter, the comparison parameter and the SNR is greater than or equal to the comprehensive calculation result of the third preset parameter threshold values, determining that the decoding parameter, the comparison parameter and the SNR satisfy the third valid condition.

7. The method according to claim 2, further comprising: in a case where the decoding parameter, the comparison parameter and the SNR do not satisfy the second valid condition, determining that the DCI is invalid, and discarding the DCI.

8. The method according to claim 2, wherein a process of determining that the search space length does not match the number of subframes corresponding to the data transmission repetition number comprises:
acquiring a preset mismatch parameter corresponding to the DCI according to a format of the DCI; and
in a case where the number of subframes corresponding to the data transmission repetition number is greater than or equal to a product of the preset mismatch parameter and the search space length, determining that the search space length does not match the number of subframes corresponding to the data transmission repetition number.

9. The method according to claim 2, wherein a process of determining that the decoding parameter, the comparison parameter and the SNR satisfy a second valid condition comprises:
in a case where the decoding parameter, the comparison parameter and the SNR respectively satisfy the corresponding second valid condition, determining that the decoding parameter, the comparison parameter and the SNR satisfy the second valid condition, wherein the second valid condition is set for the decoding parameter, the comparison parameter and the SNR respectively;
or,
comprehensively calculating the decoding parameter, the comparison parameter and the SNR based on weight values respectively corresponding to the decoding parameter, the comparison parameter and the SNR to obtain a comprehensive calculation result of the decoding parameter, the comparison parameter and the SNR; comprehensively calculating second preset parameter threshold values to obtain a comprehensive calculation result of the second preset parameter threshold values; comparing the comprehensive calculation result of the decoding parameter, the comparison parameter and the SNR with the comprehensive calculation result of the second preset parameter threshold values; and in a case where the comprehensive calculation result of the decoding parameter, the comparison parameter and the SNR is greater than or equal to the comprehensive calculation result of the second preset parameter threshold values, determining that the decoding parameter, the comparison parameter and the SNR satisfy the second valid condition.

10. The method according to claim 1, wherein before acquiring the decoding parameter in a process that the decoder of the NPDCCH decodes the DCI, the comparison parameter obtained by comparing the encoding result obtained by reversely encoding the decoded DCI by the encoder of the NPDCCH with the DCI before decoding, and the SNR of the DCI, the method further comprises:
verifying validity of information field content of the DCI carried in the NPDCCH.

11. The method according to claim 6, wherein the decoding parameter in a process that the decoder of the NPDCCH decodes the DCI, the comparison parameter obtained by comparing the encoding result obtained by reversely encoding the decoded DCI by the encoder of the NPDCCH with the DCI before decoding, and the SNR of the DCI are acquired in a case where the verification on the validity of information field content of the DCI carried in the NPDCCH is passed.

12. The method according to claim 1, wherein a process of determining that the search space length matches the number of subframes corresponding to the data transmission repetition number comprises:
acquiring a preset mismatch parameter corresponding to the DCI according to a format of the DCI; and
in a case where the number of subframes corresponding to the data transmission repetition number is less than a product of the preset mismatch parameter and the search space length, determining that the search space length matches the number of subframes corresponding to the data transmission repetition number.

13. The method according to claim 1, wherein the decoding parameter is a path metric, and the comparison parameter is a bit error rate.

14. A terminal, comprising a memory and a processor, the memory storing a computer program, wherein when executing the computer program, the processor implements the operations of the method according to claim 1.

15. A non-transitory computer-readable storage medium, storing a computer program, wherein when executed by a processor, the computer program implements the method according to claim 1.

16. The method according to claim 1, further comprising:
in a case where the decoding parameter, the comparison parameter and the SNR do not satisfy the first valid condition, determining that the DCI is invalid, and discarding the DCI.

17. The method according to claim 1, wherein a process of determining that the decoding parameter, the comparison parameter and the SNR satisfy a first valid condition comprises:
in a case where the decoding parameter, the comparison parameter and the SNR respectively satisfy the corresponding first valid condition, determining that the decoding parameter, the comparison parameter and the SNR satisfy the first valid condition, wherein the first valid condition is set for the decoding parameter, the comparison parameter and the SNR respectively;
or,
comprehensively calculating the decoding parameter, the comparison parameter and the SNR based on weight values respectively corresponding to the decoding parameter, the comparison parameter and the SNR to obtain a comprehensive calculation result of the decoding parameter, the comparison parameter and the SNR;

comprehensively calculating first preset parameter threshold values to obtain a comprehensive calculation result of the first preset parameter threshold values;

comparing the comprehensive calculation result of the decoding parameter, the comparison parameter and the SNR with the comprehensive calculation result of the first preset parameter threshold values; and in a case where the comprehensive calculation result of the decoding parameter, the comparison parameter and the SNR is greater than or equal to the comprehensive calculation result of the first preset parameter threshold values, determining that the decoding parameter, the comparison parameter and the SNR satisfy the first valid condition.

18. The method according to claim 1, wherein the decoding parameter is an intermediate result output in a process that the decoder of the NPDCCH decodes the DCI.

19. The method according to claim 1, wherein the comparison parameter is a bit error rate between the encoding result obtained by reversely encoding the decoded DCI and the DCI before decoding, or a codeword distribution characteristic between the encoding result obtained by reversely encoding the decoded DCI and the DCI before decoding; or a comparison parameter obtained by comparing a difference between a part of codeword sets selected from the encoding result obtained by reversely encoding the decoded DCI and a part of codeword sets selected from the DCI before decoding.

20. A detection apparatus, comprising a memory storing instructions and a processor in communication with the memory, wherein the processor is configured to execute the instructions to:

acquire a decoding parameter in a process that a decoder of a Narrowband Physical Downlink Control Channel (NPDCCH) decodes Downlink Control Information (DCI), a comparison parameter obtained by comparing an encoding result obtained by reversely encoding the decoded DCI by an encoder of the NPDCCH with the DCI before decoding, and a Signal-to-Noise Ratio (SNR) of the DCI;

acquire, in a case where the decoding parameter, the comparison parameter and the SNR satisfy a first valid condition, a data transmission repetition number and a search space length of the NPDCCH; and determine, in a case where the search space length matches the number of subframes corresponding to the data transmission repetition number, that the DCI is valid.

* * * * *